Feb. 7, 1961 — M. P. BAKER — 2,970,853
RESILIENTLY MOUNTED BALL JOINT
Filed March 25, 1957

INVENTOR.
Max P. Baker
BY John T. Mann
His Attorney

United States Patent Office 2,970,853
Patented Feb. 7, 1961

2,970,853

RESILIENTLY MOUNTED BALL JOINT

Max P. Baker, Dayton, Ohio, assignor to General Motors Corporation, Detroit, Mich., a corporation of Delaware Filed Mar. 25, 1957, Ser. No. 648,081

6 Claims. (Cl. 287—90)

This invention relates to joint assemblies of the type having a ball end of a ball ended stud tiltably and rotatably supported within a socket member.

Among the objects of the present invention is one to provide a ball and joint assembly which is constructed so that the longitudinal axis of the stud normally assumes a certain predetermined angular position relative to the lateral plane of the socket in the absence of an angular force of substantial magnitude being applied thereto, and which is capable of being tilted from its normal position on the application of a substantial angular force thereto and substantially returned to its original predetermined position on removal of the force, due to the inherent construction of the joint. This and other objects are accomplished by providing a ball and socket joint wherein the ball end of a ball ended stud is provided with a toroidal contour on opposite sides of the major diameter thereof, and each of the opposite sides are encased in separate partially spherical, rigid bearing half-shells wherein substantially only ring contact is established between opposite sides of the ball and each half of the shell. The bearing shells are snugly encased in a partially spherical cavity of a unitary elastomeric bushing which in turn is snugly encased in a housing member.

In operation, when an angular force of substantial magnitude is applied with respect to the longitudinal axis of the stud to effect a tilting thereof relative to the socket from its normal position, one of the bearing half-shells is moved in one lateral direction and the other bearing half-shell is moved in the opposite lateral direction against the elastic resistance of the elastomeric bushing so that when the force is removed the elastic resistance of the bushing tends to return the ball stud to its original position.

In a preferred form of the invention the greatest diameter end of each of the half-shells is provided with outwardly directed flanges which are received in an internal annular groove of the spherical cavity of the elastomeric bushing, in spaced relation, whereby the assembly of the joint is facilitated and the efficiency of the joint is improved.

The ball joint of the present invention is particularly useful in connection with certain automotive vehicle rear wheel suspensions wherein a link pivotally connects the rear axle housing to the frame by means of ball joints. In an installed position a ball stud is fixed to the axle housing and to the frame in a position wherein the longitudinal axis of the studs is aligned with the transverse axis of the car body and in a horizontal position relative to the ground. The link is provided with a socket construction on each end thereof connecting the two ball studs. If the ball members were spherical as in conventional ball joints, the link would normally sag or tilt downwardly due to its weight until the studs engaged the edges of the socket openings through which the studs project. The ball joint of the present invention causes the link to be supported in a position substantially normal to the horizontal axis of the car.

Further objects and advantages of the present invention will be apparent from the following description reference being had to the accompanying drawings wherein a preferred embodiment of the present invention is clearly shown.

Figure 1:
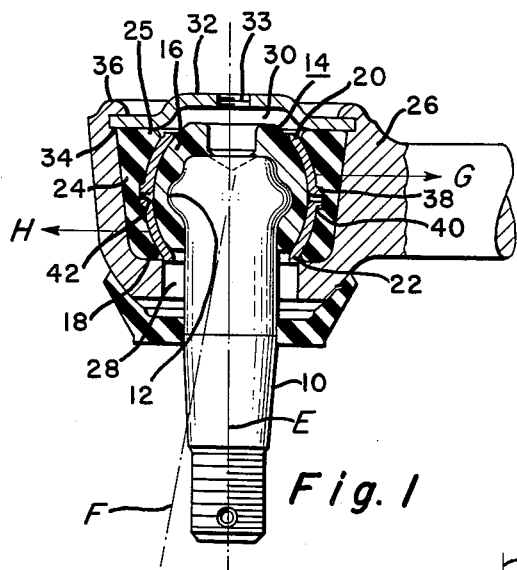
Figure 1 is an elevation view in cross section of a ball joint assembly embodying one form of the present invention.
Figure 3:
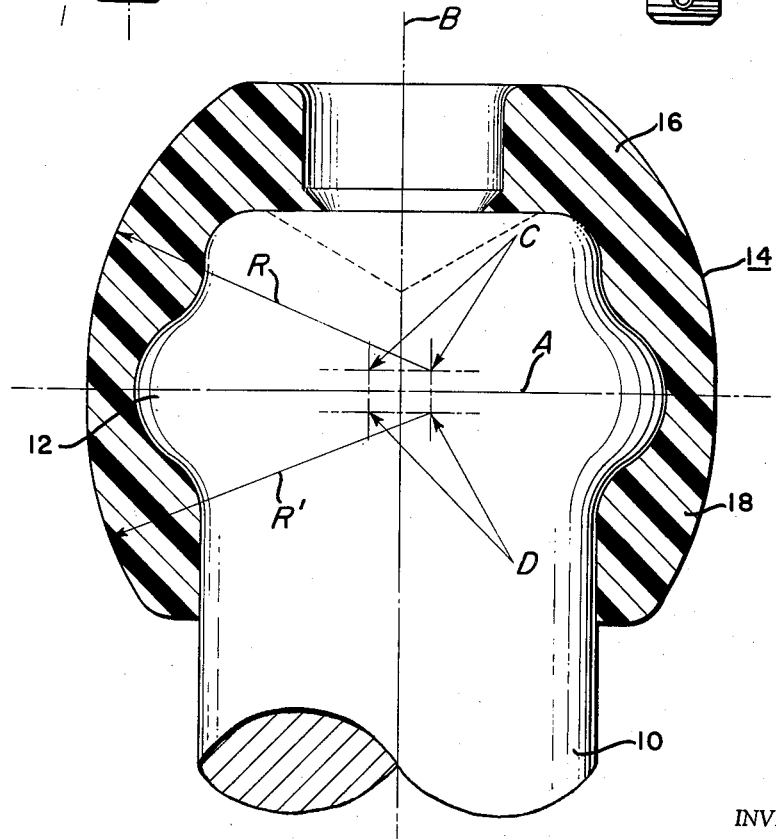
Figure 3 is an enlarged fragmentary view of a ball ended stud shown in cross section.

Referring to the drawings, Figure 1 illustrates one form of the invention which includes a stud 10 having a circumferential rib 12 at one end thereof over which is molded a high impact plastic ball 14. As shown in Figure 3 the ball 14 is provided with toroidally-contoured surfaces on the opposite sides of the major diameter of circle A of the ball which are designated as the ball end side 16 and the stud end side 18 respectively. The toroidally-contoured surface of the ball end side 16 may be described as generated from the periphery of the circle C which lies in a flat horizontal plane perpendicular to the longitudinal axis B of the ball stud and a predetermined distance above the major diameter A of the ball. Accordingly on the ball end side 16 there is formed an annular curved surface or toroidally-contoured portion extending above and below a plane through circle C from which radius R centered anywhere around the periphery of the circle C from the side of the circle away from the surface can be swung relative to a point along the periphery of the circle in any vertical plane radially in alignment with a radius of circle C lying in that same plane and in which plane a radially outer end of radius R defines a curve or arc that coincides with the annular curved surface or toroidally-contoured portion describeable as a surface of revolution generated by rotating the arc or curve struck by radius R through 360° about longitudinal axis B of the ball stud. Similarly the toroidally-contoured surface of the stud end 18 of the ball is generated by an arc or curve defined by the radius R' centered on the circle D located a predetermined distance below the major diameter A of the ball. The predetermined distance which the circles C and D are respectively located above and below the major diameter A of the ball is determined by the character of the toroidally-contoured ball surface desired in connection with the use to which a given ball joint is put.

Figure 2:
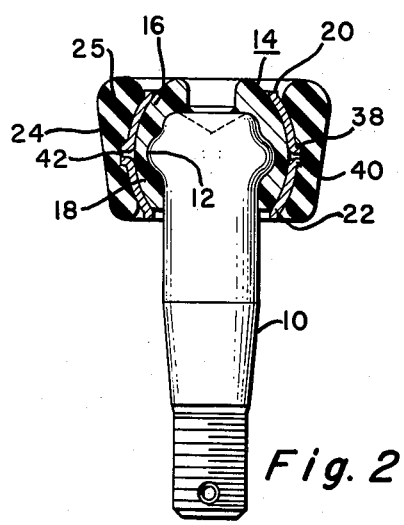
Figure 2 is an elevation view in cross section of a portion of the assembly shown in Figure 1.

As shown in Figure 2 the ball 14 is encased in a pair of metal segmental shells 20 and 22 having an internal partially spherical surface, the shell 20 encasing the ball end side 16 and the shell 22 encasing the stud side 18 respectively. As a result substantially only ring or line contact is established between the ball side 16 and 18 and the bearing shells 20 and 22 respectively. The ball 14 and the encasing shells 20 and 22 in assembled relation are received in a partially spherical cavity of a unitary elastomeric bushing 24 which, as shown in Figure 1, is snugly encased in a housing member 26 having an opening 28 at one end thereof which receives the stud, and an opening 30 at the opposite end for receiving the sub-assembly shown in Figure 2, which is closed by means of a closure plate 32 seated on a shoulder 34 of the housing member and secured thereof by peening over the edges of the housing member. The shells 20 and 22 are preferably bonded to the bushing 24.

As is indicated in Figure 2 the largest diameter ends of the shells 20 and 22 are provided with outwardly directed flanges 38 and 40 respectively which are received in an annular internal groove 42 provided in the surface of the spherical cavity of the elastomeric bushing 24. The groove 42 is preferably formed of a rectangular cross section whereby the flanges 38 and 40 may be snapped into place to facilitate the assembly of the parts and to insure that the shells are maintained in a proper position during the operation of the ball joint.

The operation of the ball joint may be seen in relation to Figure 1. If the longitudinal axis of the stud 10 is tilted from its normal position E to an angular position F by an appropriate force, the ring contact point of the ball end portion 16 and the shell 20 will be shifted in a clock-wise direction to cause the shell 20 to be moved to the right as indicated by the arrow G, and the ring contact point of the stud end 18 of the ball and the shell 22 will be similarly shifted to cause the shell 22 to be moved to the left as indicated by the arrow H, thereby causing a compression and distortion of the elastomeric bushing 24 which when the ball stud tilting force is removed will react to return the ball stud to its original position.

The housing member 26 may be a stamping or a forging as shown in Figure 1 and form a portion of a connecting link. As shown in Figure 1 the cavity of the housing which receives the elastomeric bushing 24 is preferably formed in a frusto-conical shape and the elastomeric bushing 24 is similarly of frusto-conical shape whereby it may be readily and snugly inserted in the frusto-conical socket of the housing member 26. The upper portion 25 of the bushing 24 is accordingly of greater diameter and the walls thereof are of greater thickness. The bushing 24 is further of a somewhat greater length than the depth of the housing cavity which receives it, so that when the closure plate 32 is clamped into place, the bushing 24 is loaded to a moderate degree whereby the bushing seats snugly within the cavity and a slight tilting of the ball stud causes a distortion of the bushing which is operative to exert pressure to return the ball stud to its normal position or to resist a tilting of the stud due to only moderate angular pressure as for example may be exerted by the weight of the housing or link connected thereto. The normally loaded condition of the bushing 24 is also operative to take up wear of the bearing parts.

The shell flanges 38 and 40 are preferably spaced from each other as shown in the drawings to insure that the shells may shift independently and that a moderate wear of the parts will not appreciably reduce the efficiency of the joint.

To provide effective lubrication of the ball joint assembly, the ball is provided with a plurality of longitudinal grooves (not shown) across the surface thereof and a suitable lubricant is admitted through the aperture 33 of the closure 32 by means of a suitable fixture (not shown). In the embodiment shown, the ball is formed of a high impact thermosetting plastic such as a fiber filled phenol-formaldehyde resin and the shells 20 and 22 are formed of a rigid metallic material. However the ball may be made entirely of steel and the shells may be made of a rigid high impact plastic material with internal lubricating grooves. Other materials may be utilized in providing suitable bearing surfaces as for example porous metal which are well known in the art.

By the term "elastomeric" as used herein is meant any of the well known rubber-like materials such as natural rubber, butadiene-styrene copolymer, butadiene-acrylonitrile copolymer, polychloroprene, polysulfide rubbers, polyisocyanate modified rubber-like materials, and suitable mixtures of these and similar rubber-like materials. By the term "high impact plastics" is meant any of the thermosetting resins such as phenol-formaldehyde, phenol-formaldehyde resins, phenol-furfural resins and the like, filled with a suitable masticated paper or fiber fillers or a fabric filler to provide the resins with suitable high impact properties as is well known in the art.

While the embodiments of the present invention as herein disclosed constitute a preferred form, it is to be understood that other forms might be adopted.

What is claimed is as follows:

1. A ball and socket joint, comprising: a ball ended stud having exterior annular curved surfaces axially adjacent to each other and each generated by revolution of an arc about a longitudinal axis of said stud, said surfaces having a location on opposite sides of a major diameter of said stud such that the arc to define each surface has a radius swung in a plane coinciding with that of a radius of a circle around the longitudinal axis and swung about a point lying in a periphery of the corresponding circle which is located on a side of major diameter of the ball ended stud opposite the side where a circle of points of origin of a radius for the other surface is located, a pair of rigid partially spherical complementary half-shells defining a socket for said surfaces of said ball ended stud and engaging said annular curved surfaces substantially only along localized rings on opposite sides of the major diameter, a hollow one-piece elastomeric bushing having a partially spherical cavity snugly receiving said shells, and a housing for snugly receiving said bushing.

2. A ball and socket joint comprising: a ball ended stud; a pair of rigid partially spherical complementary half-shells defining a socket for the ball end of the stud, engaging the ball substantially only along localized rings on opposite toroidally-contoured sides of the major diameter of the ball; a hollow one-piece elastomeric bushing having a partially spherical cavity snugly receiving said shells, and a housing enclosure assembly for snugly receiving said bushing, said toroidally-contoured sides including external surfaces of revolution struck by an arc defined by radii having points of origin lying in circles spaced from each other.

3. A ball and socket joint comprising: a ball ended stud having a circumferentially laterally-extending rib; a pair of rigid partially spherical complementary half-shells defining a socket for the ball portion of the stud, engaging the ball substantially only along localized rings on opposite toroidally-contoured sides of the major diameter of the ball, said half-shells having outwardly directed annular flanges facing each other at the greatest diameter ends thereof; said ball portion of the stud including a one-piece plastic bushing provided intermediate said half-shells and said circumferential rib; a hollow one-piece elastomeric bushing having a partially spherical cavity snugly receiving said shells, the greatest diameter of said cavity having an internal annular groove for receiving said shell flanges; and a housing and closure assembly for snugly receiving said bushing, said toroidally-contoured sides of said one-piece plastic bushing of said ball portion including a surface of revolution generated by rotating an arc struck by radii having points of origin spaced from each other.

4. A ball and socket joint comprising: a ball ended stud having toroidally-contoured side portions formed by a high impact plastic one-piece ball provided over a circumferential rib of said stud; a pair of rigid partially spherical complementary half-shells encasing the ball end of said stud, said half-shells having outwardly directed annular flanges facing each other at the greatest diameter ends thereof; a hollow one-piece elastomeric bushing having a partially spherical cavity snugly receiving said shells, the greatest diameter of said cavity having an internal annular groove for receiving said shell flanges; and a housing enclosure assembly for snugly receiving said bushing, said side portions of said high impact plastic one-piece ball each including a surface of revolution generated by rotating an arc struck by a radius having a point of origin along a periphery of a circle from the side of the circle away from the surface.

5. A ball and socket joint comprising: a ball ended stud, the ball end of said stud having axially adjacent annular curved surfaces on opposite sides of the major diameter thereof; a pair of rigid partially spherical complementary half-shells each engaging an opposite side of said ball end whereby each shell engages said ball end substantially only along localized rings on opposite sides of said major diameter of the ball end; a hollow one-piece elastomeric bushing having a partially spherical cavity snugly receiving said shells, and a housing enclosure assembly for snugly and compressably receiving said bushing, said surfaces each extending above and below a plane through a circle along which separate radii are centered to define said axially adjacent annular curved surfaces.

6. A ball and socket joint comprising: a ball ended stud, the ball end of said stud having exterior axially adjacent annular curved surfaces on opposite sides of the major diameter thereof; a pair of rigid partially spherical complementary half-shells each engaging an opposite side of said ball end whereby each shell engages said ball end substantially only along localized rings on opposite sides of the said major diameter, said half-shells having outwardly directed flanges at the greatest diameter ends thereof facing each other in spaced relation; a hollow one-piece resilient bushing having a partially spherical cavity snugly receiving said shells, the greatest diameter of said cavity having an annular groove for receiving said flanges, and a housing and closure assembly for receiving said bushing, said surfaces each having a radius originating from a periphery of a circle located a predetermined distance on opposite sides of the major diameter.

References Cited in the file of this patent

UNITED STATES PATENTS

| | | |
|---|---|---|
| 1,883,882 | Davis | Oct. 25, 1932 |
| 1,940,895 | Wacker | Dec. 26, 1933 |
| 1,989,116 | Strauss | Jan. 29, 1935 |
| 2,126,708 | Schmidt | Aug. 16, 1938 |
| 2,592,566 | Heim | Apr. 15, 1952 |
| 2,740,649 | Latzen | Apr. 3, 1956 |
| 2,759,244 | Heim | Aug. 21, 1956 |
| 2,846,251 | Herbenar | Aug. 5, 1958 |
| 2,855,232 | Kozak | Oct. 7, 1958 |

FOREIGN PATENTS

| | | |
|---|---|---|
| 854,731 | Germany | Nov. 6, 1952 |
| 1,091,445 | France | Apr. 12, 1955 |